(12) United States Patent
Dreiman et al.

(10) Patent No.: US 7,044,717 B2
(45) Date of Patent: May 16, 2006

(54) LUBRICATION OF A HERMETIC CARBON DIOXIDE COMPRESSOR

(75) Inventors: Nelik I. Dreiman, Tipton, MI (US); Rick L. Bunch, Tecumseh, MI (US)

(73) Assignee: Tecumseh Products Company, Tecumseh, MI (US)

( * ) Notice: Subject to any disclaimer, the term of this patent is extended or adjusted under 35 U.S.C. 154(b) by 294 days.

(21) Appl. No.: 10/166,646

(22) Filed: Jun. 11, 2002

(65) Prior Publication Data

US 2003/0228233 A1 Dec. 11, 2003

(51) Int. Cl.
F04B 39/02 (2006.01)

(52) U.S. Cl. .................... 417/366; 417/371; 417/410.3; 417/902; 418/94; 184/6.16

(58) Field of Classification Search ................ 417/366, 417/371, 410.3, 902; 418/83, 94; 184/6.16
See application file for complete search history.

(56) References Cited

U.S. PATENT DOCUMENTS

| | | | |
|---|---|---|---|
| 583,962 A | 6/1897 | Winand | |
| 1,427,205 A | 9/1922 | Grant | |
| 1,764,465 A | 6/1930 | Nute | |
| 2,130,349 A | 9/1938 | Kucher | |
| 2,178,425 A | 10/1939 | Johnson | 230/210 |
| 2,246,273 A | 6/1941 | Davidson | 230/140 |
| 2,583,583 A | 1/1952 | Mangan | 230/206 |
| 2,669,384 A | 2/1954 | Dills | |
| 2,905,510 A | 9/1959 | Gardiner | 308/134.1 |
| 2,926,972 A | 3/1960 | Burrell | |
| 3,049,285 A | 8/1962 | Doeg | 230/206 |
| 3,194,490 A | 7/1965 | Roelsgaard | 230/206 |
| 3,253,776 A * | 5/1966 | Parker | 417/372 |
| 3,334,808 A * | 8/1967 | Parker et al. | 417/372 |
| 3,403,846 A * | 10/1968 | Parker | 417/372 |
| 3,499,600 A | 3/1970 | McGregor | |
| 3,674,382 A | 7/1972 | Kubota et al. | 417/372 |
| 3,692,435 A | 9/1972 | Iida et al. | 417/372 |
| 3,767,013 A | 10/1973 | Caldwell | 184/6.3 |
| 3,781,138 A | 12/1973 | Bellmer | 417/368 |
| 3,804,202 A | 4/1974 | Funke | |
| 3,848,702 A * | 11/1974 | Bergman | 184/6.3 |
| 4,174,927 A | 11/1979 | Lindstrom | |
| 4,236,879 A | 12/1980 | Abe | |

(Continued)

FOREIGN PATENT DOCUMENTS

| | | |
|---|---|---|
| DE | 833 459 | 10/1952 |
| JP | 61-268890 | 11/1986 |
| JP | 2-42192 | 2/1990 |
| JP | 9-329093 | 12/1997 |
| JP | 10-288178 | 10/1998 |

Primary Examiner—Charles G. Freay
(74) Attorney, Agent, or Firm—Baker & Daniels (57) ABSTRACT

A hermetic compressor which uses carbon dioxide as the working fluid. The compressor includes a motor and a compression mechanism operatively coupled by a drive shaft supported by a bearing. The drive shaft includes a radially extending bore in fluid communication with an oil supply passageway in the drive shaft and the outer periphery of the drive shaft. An oil accumulating cavity is located beneath the radially extending bore in which oil is stored during compressor shutdown to provide oil to bearing surfaces upon compressor startup. An oil return system includes a chamber located at one end of the drive shaft and an oil return passageway extending from the chamber to an annulus formed between the bearing and the drive shaft. The oil in the annulus lubricates the bearing and drive shaft interface. A discharge tube is provided having means for aspirating oil from an oil containing sump when the oil in the oil sump reaches a particular level.

18 Claims, 5 Drawing Sheets

U.S. PATENT DOCUMENTS

| | | | |
|---|---|---|---|
| 4,403,927 A | 9/1983 | Butterworth et al. | 418/55 |
| 4,406,594 A | 9/1983 | Smaby et al. | 417/368 |
| 4,568,256 A | 2/1986 | Blain | 418/55 |
| 4,575,320 A * | 3/1986 | Kobayashi et al. | 418/55 |
| 4,607,503 A * | 8/1986 | Fry | 62/503 |
| 4,702,682 A | 10/1987 | Inaba et al. | 418/55 |
| 4,704,076 A | 11/1987 | Kawaguchi et al. | 418/91 |
| 4,717,316 A | 1/1988 | Muramatsu et al. | 417/372 |
| 4,724,928 A | 2/1988 | Lewis et al. | 184/6.18 |
| 4,762,477 A | 8/1988 | Hayano et al. | |
| 5,007,808 A * | 4/1991 | Fraser, Jr. et al. | 417/368 |
| 5,022,146 A * | 6/1991 | Gannaway et al. | 29/888.02 |
| 5,087,170 A | 2/1992 | Kousokabe et al. | 415/110 |
| 5,445,504 A | 8/1995 | Iwamura et al. | 417/368 |
| 5,533,875 A | 7/1996 | Crum et al. | 417/368 |
| 5,551,852 A * | 9/1996 | Saito et al. | 418/98 |
| 5,586,876 A | 12/1996 | Yasnnascoli et al. | 418/60 |
| 5,660,539 A | 8/1997 | Matsunaga et al. | 418/55.6 |
| 5,716,202 A | 2/1998 | Koyama et al. | 418/55.6 |
| 5,795,140 A | 8/1998 | Jin | 417/372 |
| 5,865,607 A | 2/1999 | Fukuoka | 418/46 |
| 5,884,727 A * | 3/1999 | Ryu | 184/6.3 |
| 5,947,709 A | 9/1999 | Koyama et al. | 418/55.6 |
| 6,012,911 A | 1/2000 | Hirooka et al. | |
| 6,012,922 A | 1/2000 | Hirooka et al. | 418/55.5 |
| 6,171,076 B1 | 1/2001 | Gannaway | 417/350 |
| 6,312,233 B1 | 11/2001 | Ahn et al. | 417/312 |
| 6,631,617 B1 * | 10/2003 | Dreiman et al. | 62/84 |

\* cited by examiner

FIG_1

FIG_7

FIG_8

FIG_9

FIG_10

LUBRICATION OF A HERMETIC CARBON DIOXIDE COMPRESSOR

BACKGROUND OF THE INVENTION

The present invention relates to hermetic compressors and more particularly to two stage compressors using carbon dioxide as the working fluid.

Conventionally, multi-stage compressors are ones in which the compression of the refrigerant fluid from a low, suction pressure to a high, discharge pressure is accomplished in more than one compression process. The types of refrigerant generally used in refrigeration and air conditioning equipment include clorofluorocarbons (CFCs) and hydrochlorofluorocarbon (HCFC). Additionally, carbon dioxide may be used as the working fluid in refrigeration and air conditioning systems. By using carbon dioxide refrigerant, ozone depletion and global warming are nearly eliminated. Further, carbon dioxide is non-toxic, non-flammable, and has better heat transfer properties than CFCs and HCFC, for example. The cost of carbon dioxide is significantly lower than CFC and HCFC. Additionally, it is not necessary to recover or recycle carbon dioxide which contributes to significant savings in training and equipment.

In a two stage compressor, the suction pressure gas is first compressed to an intermediate pressure. The intermediate pressure gas can be directed to the second stage suction side or cooled in the unit heat exchanger before delivery to the second stage suction. The intermediate pressure gas is next drawn into a second compressor mechanism where it is compressed to a higher, discharge pressure for use in the remainder of a refrigeration system.

The compression mechanisms of the two stage compressor may be stacked atop one another on one side of the motor, or positioned with one located on each side of the motor. When the compression mechanisms are located on opposite sides of the motor, each compression mechanism is provided with an oil sump which provides lubricating oil to the respective compressor components. Oil in the lower, main sump provides lubrication to the first compression mechanism and is drawn through a passage in the drive shaft to lubricate the second compression mechanism. Oil from the upper sump also provides lubrication to the second compression mechanism.

Problems may occur if the excess oil does not return to the main oil sump during compressor operation and collects in the upper sump. Such problems include overfilling of the upper sump and depleting the supply of oil in the lower, main sump. If the amount of oil in the lower sump is reduced, the amount of oil required to lubricate the bearing surfaces may be insufficient.

During shutdown of the compressor, a portion of the unused or excess oil may return to the main oil sump by gravity. The amount of oil between bearing surfaces is significantly reduced or eliminated. When the compressor is restarted, the bearings surfaces come into contact with one another which can damage these surfaces.

It is desired to provide a two stage hermetic compressor which uses carbon dioxide as the working fluid and is provided with a lubrication system that improves lubrication during startup and operation of the compressor.

SUMMARY OF THE INVENTION

The present invention relates to a two stage hermetic compressor which uses carbon dioxide as the working fluid. The compressor has a pair of compression mechanisms located at opposite ends of an electric motor. The compression mechanisms and motor are housed in separate housings forming modules which are secured to one another during assembly of the compressor. A drive shaft operatively connects the motor and compression mechanisms. An oil sump containing lubricating oil is formed in each compression mechanism module. The drive shaft is provided with a longitudinal passageway through which oil from the lower sump passes to supply a plurality of radially extending passageways in the shaft. Extending from the radial passageways are inclined oil accumulating cavities which store oil during compressor shutdown. The oil is immediately supplied the bearing surfaces upon startup of the compressor to prevent metal-to-metal contact between bearing surfaces.

The compressor of the present invention further includes an oil return system including a recess formed at the upper end of the drive shaft. The oil in the recess is directed to an oil annulus formed in the drive shaft via passageways formed in the outboard bearing, cylinder block, and main bearing of the upper compression mechanism module. The oil in the annulus then passes through the motor module and returns to the lower sump.

The compressor of the present invention also includes a discharge tube mounted in the upper compression mechanism module. The discharge tube is provided with a plurality of apertures located near the bottom thereof. If the level of the oil in the upper sump is at or above the level of the apertures in the discharge tube, oil is aspirated into the discharge pressure gas entering the refrigeration system.

The compressor of the present invention provides a hermetic compressor including a housing having a motor mounted therein. A compression mechanism is also located in the housing being operatively coupled to the motor by a drive shaft supported by a bearing. A longitudinal passageway is centrally located in the drive shaft. At least one radially extending bore is formed in the drive shaft in fluid communication with the longitudinal passageway and an outer periphery of the drive shaft located within the bearing. A downwardly extending, blind cavity is formed in the drive shaft with the blind cavity being located beneath the radially extending bore.

The compressor of the present invention further provides a hermetic compressor having a housing with an oil containing sump formed therein. A motor is mounted in the housing. The motor is operatively coupled to a compression mechanism located in the housing by a drive shaft supported by a bearing. The drive shaft has a first and second end and a longitudinal oil supply passageway extending therethrough in fluid communication with the sump. A chamber is located at the first end of the drive shaft in fluid communication with the oil supply passageway with oil from the sump being provided to the chamber through the oil supply passageway. An oil return passageway extends from the chamber to an annulus formed between the bearing and the drive shaft. Lubricating oil is provided to the annulus through the oil return passageway such that the bearing and drive shaft interface is lubricated.

The present invention also provides a hermetic compressor for compressing refrigerant therein including a housing having at least a first and second compartment. A motor is mounted in the first compartment and a compression mechanism is located in the second compartment. A drive shaft operatively couples the motor and the compression mechanism. A lubricating oil sump is formed in the second compartment. A discharge tube is located in the second compartment through which refrigerant gas in the second compartment exits the compressor. The discharge tube includes means for aspirating oil from the oil sump when the oil in the oil sump reaches a particular level.

One advantage of the present invention is that the lubrication system provides oil accumulating cavities in the drive shaft and on the eccentric which supply bearing surfaces with sufficient lubrication during startup and operation of the compressor.

An additional advantage of the present invention is the oil return portion of the lubrication system which directs oil after lubrication of the upper compression mechanism to the lower, main sump to prevent the main sump from being depleted of its oil supply.

Another advantage of the present invention is that the discharge outlet of the compressor is provided with a bleed aperture through which oil is aspirated and carried with the discharge gas into the refrigeration system to further prevent overfilling of the upper sump.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein.

Corresponding reference characters indicate corresponding parts throughout the several views. Although the drawings represent embodiments of the present invention, the drawings are not necessarily to scale and certain features may be exaggerated in order to better illustrate and explain the present invention.

DETAILED DESCRIPTION OF THE INVENTION

Figure 1:
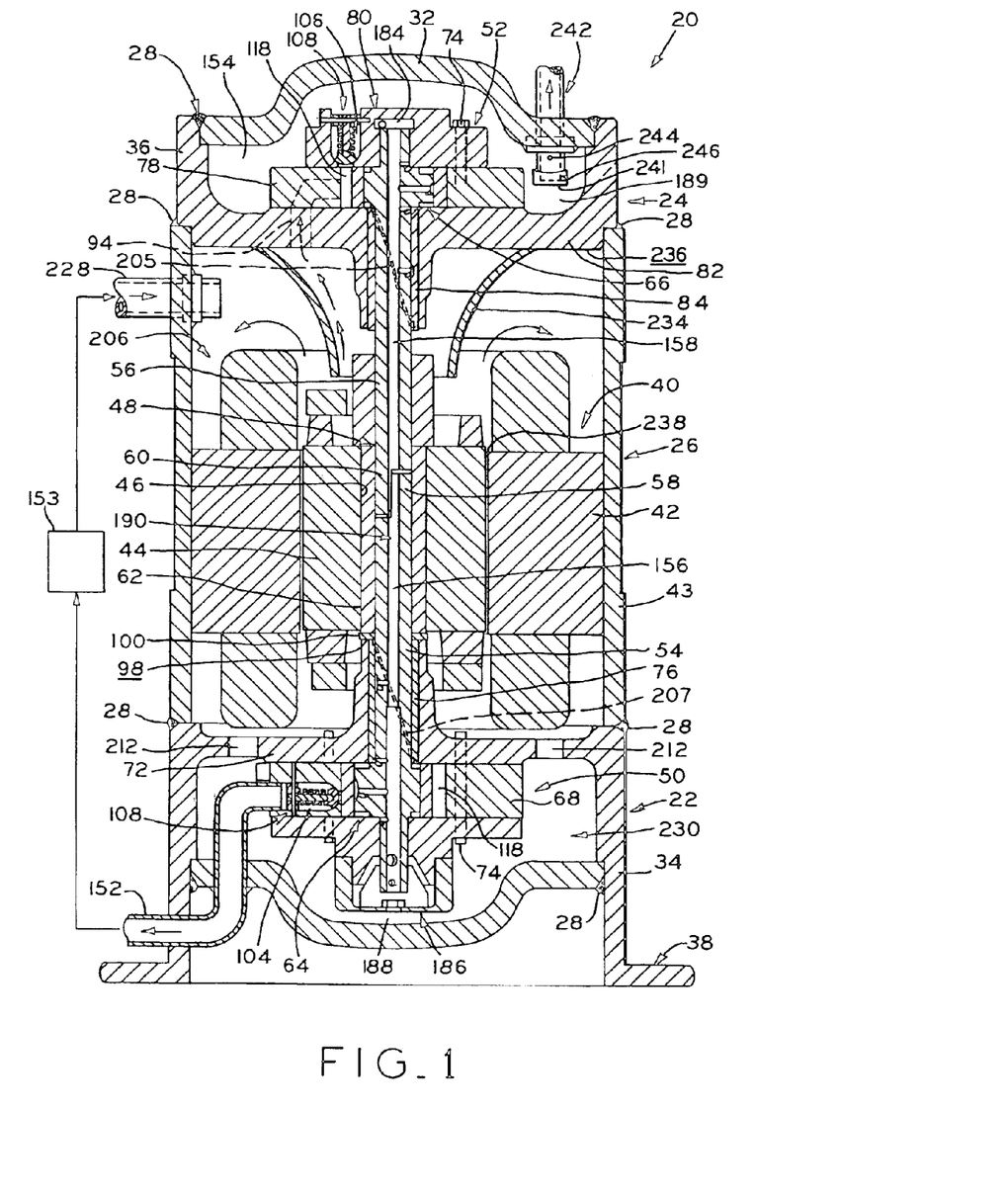
FIG. 1 is a sectional side view of a compressor assembly in accordance with the present invention.

Referring to FIG. 1, positive displacement, two stage rotary hermetic compressor 20 includes lower end compression module 22 and upper end compression module 24 which are coaxially coupled to opposite axial ends of the electric motor module 26. Compression modules 22 and 24 are affixed to motor module 26 using any suitable method including welding, brazing, or the like as at 28. Compression modules 22 and 24 are hermetically sealed by caps 30 and 32 which are secured to substantially cylindrical compression mechanism housing walls 34 and 36, respectively, by welds 28, for example. Lower housing wall 34 further includes annular flange 38 extending substantially perpendicularly from the outer surface thereof. Annular flange 38 is provided to support compressor 20 in a substantially vertical position.

The working fluid used for the refrigeration system of the present invention may be carbon dioxide, for example. When carbon dioxide is compressed, the pressures produced are significantly greater than those produced when using HCFC refrigerant, for example. In order to accommodate for the high working pressures of carbon dioxide, walls 36 of upper compression module 24 are constructed to be thick enough to withstand the higher pressure gas. Walls 36 are thicker than walls 34 of lower compression module 22 as the pressures produced during the first stage of compression are substantially lower than produced during the second stage of compression.

The use of carbon dioxide in commercial, residential, automotive, and military applications has been analyzed and the results presented in a publication by Kruse H., Hedelck R., and Suss J., "The Application of Carbon Dioxide as a Refrigerant", IIR Bulletin, Vol. 1999-1, and pp. 2–21. Additionally, a publication by Lorenz, G., et al., "New Possibility for Non-CFC Refrigeration", Proc. IIR, 1992, vol. 21, no. 3, pp. 147–163 discusses further applicability of carbon dioxide.

Located within electric motor module 26 is electric motor 40 including stator 42 and rotor 44. Stator 42 is interference fitted within cylindrical housing 43 of module 26 at substantially the axial center thereof by a method such as shrink fitting, for example. Axial cylindrical aperture 46 is located centrally through rotor 44 for receiving cylindrical sleeve 62 disposed about drive shaft 48 which is mounted therein for rotation with rotor 44. The lower and upper ends of drive shaft 48 are drivingly connected to first and second stage compression mechanisms 50 and 52 housed in lower and upper end compression modules 22 and 24, respectively.

Drive shaft 48 is constructed from lower drive shaft 54 and upper drive shaft 56. Integrally formed near the joint ends of drive shafts 54 and 56 are keys 58 and 60, respectively. Keys 58 and 60 are cut to form a semi-cylindrical end, which slidingly interlock to rotatably fix the lower and upper drive shafts and form the complete cylinder of drive shaft 48. Cylindrical sleeve 62 is mounted onto drive shaft 48 by any suitable method including shrink fitting, over the coupling between lower and upper drive shafts 54 and 56. Sleeve 62 is interference fitted within aperture 46 for rotation with rotor 44. Integrally formed near the outer ends of drive shafts 54 and 56 are eccentric portions 64 and 66, respectively. Drive shafts 54 and 56 are coupled to one another such that eccentric portions 64 and 66 are radially offset by 180° to achieve better dynamic balance and motor loading.

Figure 4:
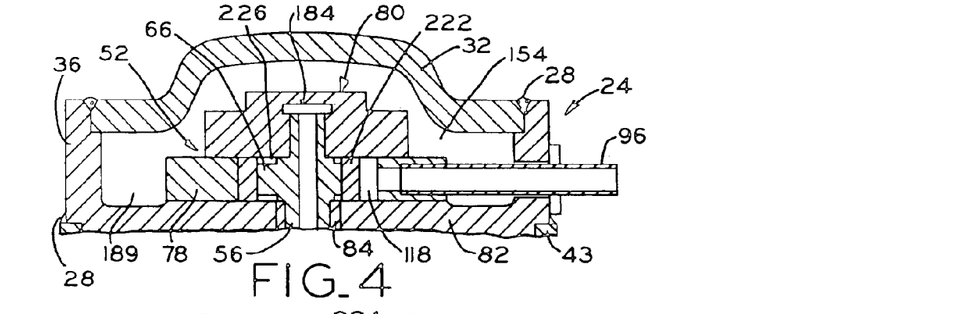
FIG. 4 is a fragmentary sectional view of the compressor assembly of FIG. 1, showing the upper compression mechanism having an alternative intake passage.
Figure 5:
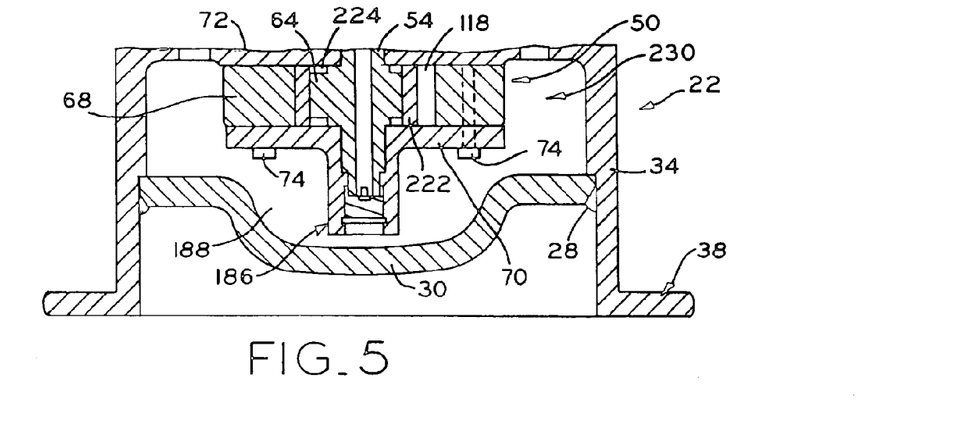
FIG. 5 is a fragmentary sectional view of the compressor assembly of FIG. 1, showing the lower compression mechanism.

Referring to FIGS. 1, 4, and 5, first stage compression mechanism 50 and second stage compression mechanism 52 are mounted within modules 22 and 24. The modular design provides motor 40 and compression mechanisms 50 and 52 with individual housings, each being maintained at a substantially different pressure. The modular design also reduces the cost of assembly of compressor 20 and facilitates flexibility of design by providing respective modules 22 and 24 of different capacities.

As shown in FIGS. 1 and 5, first stage compression mechanism 50 includes cylinder block 68 located between outboard bearing 70 and frame or main bearing 72 which is integrally formed with housing walls 34. Fasteners 74 extend through outboard bearing 70 and cylinder block 68 to secure bearing 70 and cylinder block 68 to main bearing 72. Lower drive shaft 54 is rotatably mounted in main bearing 72 by journal 76. As illustrated in FIGS. 1 and 4, second stage compression mechanism 52 includes cylinder block 78 located between outboard bearing 80 and frame or main bearing 82 which is integrally formed with housing walls 36. Fasteners 74 secure outboard bearing 80 and cylinder block 78 to main bearing 82. Upper drive shaft 56 is mounted in main bearing 82 by journal 84. Eccentric portions 64 and 66 of drive shafts 56 and 58 are received in cylinder blocks 68 and 78 to drive compression mechanisms 50 and 52.

Figure 6A:
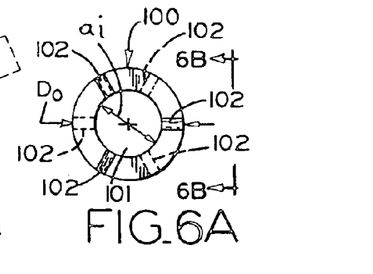
FIG. 6A is a top plan view of a thrust bearing having lubrication grooves therein.
Figure 6B:
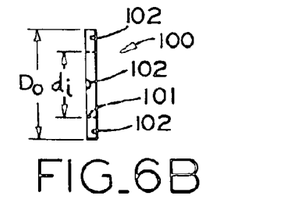
FIG. 6B is a side view of the thrust bearing of FIG. 6A taken along line 6B—6B.
Figure 7:
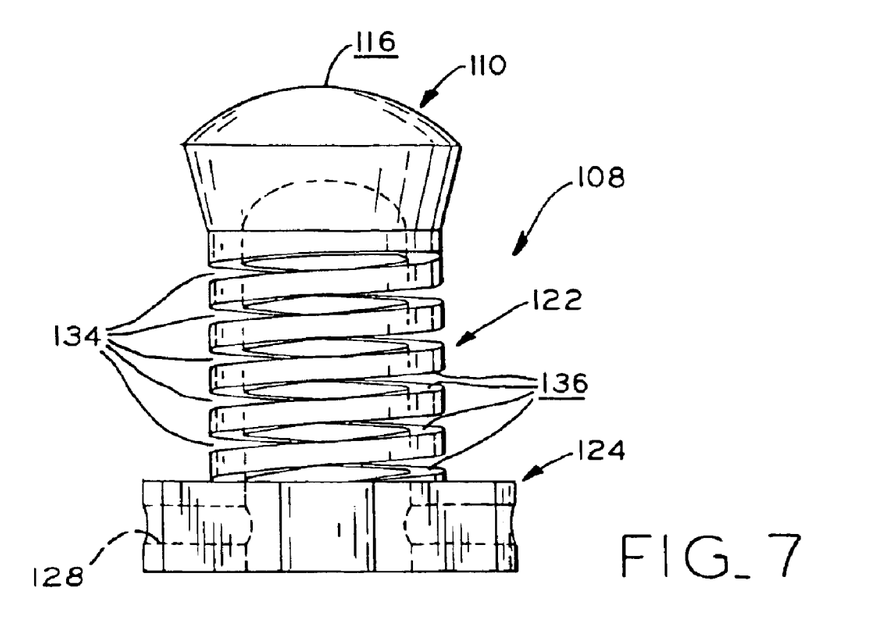
FIG. 7 is a side view of a discharge valve of the compressor assembly of FIG. 1.
Figure 8:
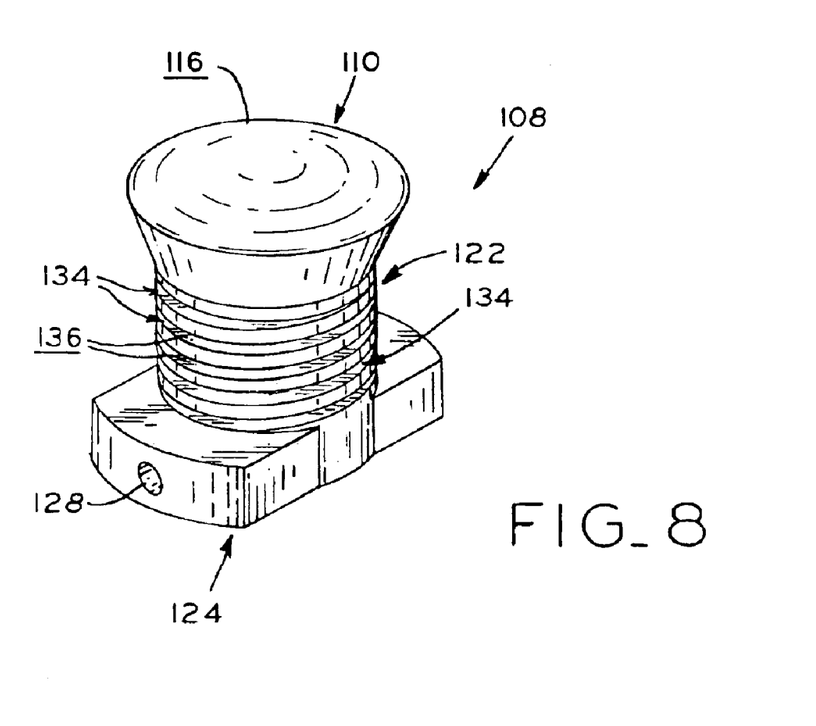
FIG. 8 is perspective view of the discharge valve of FIG. 7.

Referring to FIGS. 1, 6A, and 6B, located between sleeve 62 and upper planar surface 98 of main bearing 72 is circular thrust bearing 100 provided to accept axial loading. Thrust bearing 100 is provided with aperture 101 through which drive shaft 48 extends when assembled thereto. Circular thrust bearing 100 is constructed from any suitable material having a sufficiently low coefficient of static and kinetic friction so that rotation of sleeve 62 and thus drive shaft 48 is not hindered. Lubrication oil is delivered to the thrust-bearing surface through grooves (not shown) in main bearing 72, thereby further reducing the coefficient of friction during compressor start-up and operation. The circular shape of thrust bearing 100 helps to form a circumferential, continuous pattern of the oil film between the thrust surfaces which prevents metal-to-metal contact.

In order to determine the type of material appropriate for thrust bearing 100, the pressure-velocity (PV) loading of the thrust bearing can be used. The pressure-velocity (PV) loading may be computed for numerous external and internal diameters. The following parameters are used in these calculations:

$$P = 4W/B(D_o^2 - d_i^2)$$

where P is the static loading per unit area, psi (kg/cm$^2$); W is the static load acting on thrust bearing 100, in lb (kg). Referring to FIGS. 6A and 6B, $D_o$ is the outer diameter and $d_i$ is the inner diameter of thrust bearing 100, in (cm). The static loading per unit area (P) is first calculated using the above equation. In order to calculate the average surface velocity (V) of thrust bearing 100, the following equation is used:

$$V = B(D_m N)$$

where V has the units in/min (cm/mm); N is the speed of rotation of thrust bearing 100, rpm (cycles/min), which rotates with drive shaft 48; $D_m$ is the average diameter, in (cm), calculated by the following equation:

$$\frac{D_o + d_i}{2}$$

The Pressure-Velocity loading of thrust bearing 100 is then calculated by multiplying the static loading per unit area (P) and average surface velocity (V) to get the pressure-velocity loading (PV), psi-ft/in$^2$ min (kg-m/cm$^2$sec). These calculations are then used to select an appropriate material for bearing 100.

One type of suitable material for thrust bearing 100 includes a polyamide such as VESPEL SP-21, which is a rigid resin material available from E.I. DuPont de Nemours and Company. The polyamide material has a broad temperature range of thermal stability, capable of withstanding approximately 300,000 lb. ft/in. with a maximum contact temperature of approximately 740° F. (393° C.) when unlubricated. For a machined thrust bearing 100 constructed from a material such as VESPEL, the allowable pressure (P) should not exceed 6,600 psi. The PV limit for unlubricated bearing under conditions of continuous motion should not exceed 300,000 lb ft/in$^2$ min. In this embodiment of the present invention, the ratio of the outside diameter to the inside diameter (D/d) of thrust bearing 100 should not exceed 2.

Thrust bearing 100 is provided with radially extending grooves 102 on both surfaces of bearing 100 in contact with surface 98 of main bearing 72 and sleeve 62. Grooves 102 are provided in thrust bearing 100 for communicating lubricating oil between thrust bearing 100 and the interfacing surfaces.

Figure 2:
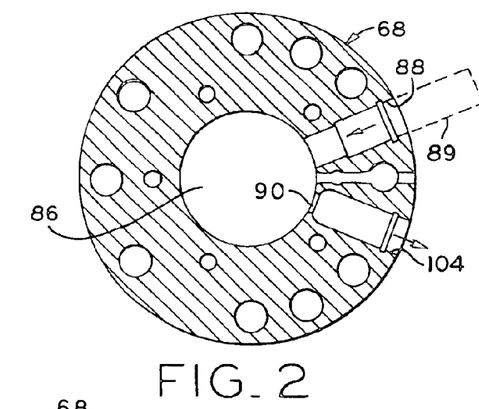
FIG. 2 is a sectional view of a cylinder block of the compressor assembly of FIG. 1.
Figure 3:
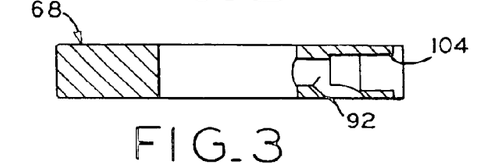
FIG. 3 is a sectional view of the cylinder block of FIG. 2, showing an alternative intake passage.

Referring to FIGS. 1, 4, and 5, first and second stage compression mechanisms 50 and 52 are illustrated as rotary type compression mechanisms, however, compression mechanisms 50 and 52 may be reciprocating, rotary, or scroll type compressors. Rotary compressors generally include a vane slidingly mounted in the cylinder block, which divides compression chamber 118 located between cylinder blocks 68, 78 and rollers 220, 222 surrounding eccentrics 64, 66 of drive shafts 54, 56. The vane reciprocates into and out of the cylinder block as it orbits about the drive shaft. Referring to FIG. 2, cylinder block 68 is provided with aperture 86 in which eccentric portion 64 surrounded by roller 220 is received. Radially extending from aperture 86 is intake passage 88 through which gas to be compressed is drawn into compression chamber 118. An intake tube may be used to communicate refrigerant to intake passage 88 as schematically depicted by dashed outline 89 in FIG. 2 and as exemplified by tube 96 used with mechanism 52 in FIG. 4. Once the refrigerant gas is compressed to a higher pressure, it is discharged through radially extending discharge passage 104. Alternatively, as shown in FIG. 3, the intake passage may be located substantially axially to aperture 86 such as intake passage 92. Referring to FIG. 1, refrigerant gas is drawn into compression chamber 118 defined in upper cylinder block 78 via axially oriented inlet passage 94 extending through main bearing 82. Alternatively, refrigerant gas may be provided to compression chamber 118 of second stage compression mechanism 52 via radial tube 96 as shown in FIG. 4. Discharge pressure gases exit compression mechanism 52 through axially extended passage 106.

Referring to FIGS. 1 and 2, cylinder block 68 of first stage compression mechanism 50 is provided with radially extending discharge passage 104 having discharge valve 108 mounted therein. As shown in FIG. 1, outboard bearing 80 of second stage compression mechanism 52 is provided with discharge passage 106 which extends axially therethrough. Even though discharge passages 104 and 106 are illustrated as being directed radially and axially through cylinder block 68 and outboard bearing 80, respectively, the discharge passages may be in any suitable configuration through any of the cylinder block, outboard bearing, or main bearing.

Referring to FIGS. 1, 7, 8, 9, and 10, one discharge valve 108 is mounted in each discharge passage 104 and 106. During compressor operation, discharge valve 108 reciprocates within discharge passages 104 and 106 so that discharge gases may pass through passages 104 and 106 and around valve 108. These discharge gases are then released into discharge tube 152 extending from first stage compression mechanism 50 or discharge pressure compartment 154 formed in upper compression mechanism module 24, for example. Discharge valve member 108 is an integral one piece valve-spring-retainer assembly formed from one piece of material having semi-spherical head portion 110, rectangular wire spring 122, and valve support 124 including coupling attachment 126. Discharge valve 108 is formed from a single piece of material having elasticity, fatigue, and corrosion resistance qualities. The material must also have spring-like qualities so that spring 122 may be biased into a closed position and may be compressed to open valve 108. Materials possessing such characteristics may include high strength materials such as 17-4PH corrosion resistant steel, 15-5 PH, C-300, BETA C Titanium, 7075-T6 Aluminum, or like.

Integral discharge valve 108 includes semi-spherically shaped head portion 110 which faces semi-spherically shaped seating surface 112 (FIGS. 9 and 10) formed on the interior of the outlet end of discharge passages 104 and 106. Semi-spherical seating surface 112 provides a valve seat for discharge valve 108 and defines cylindrically shaped outlet 114 (FIGS. 9 and 10) operable by discharge valve 108. Semi-spherical valve head portion 110 includes sealing surface 116 which engages semi-spherical seating surface 112, substantially filling outlet 114 when in a closed position (FIG. 9), thereby reducing the gas reexpansion volume of the outlet 114.

Figure 9:
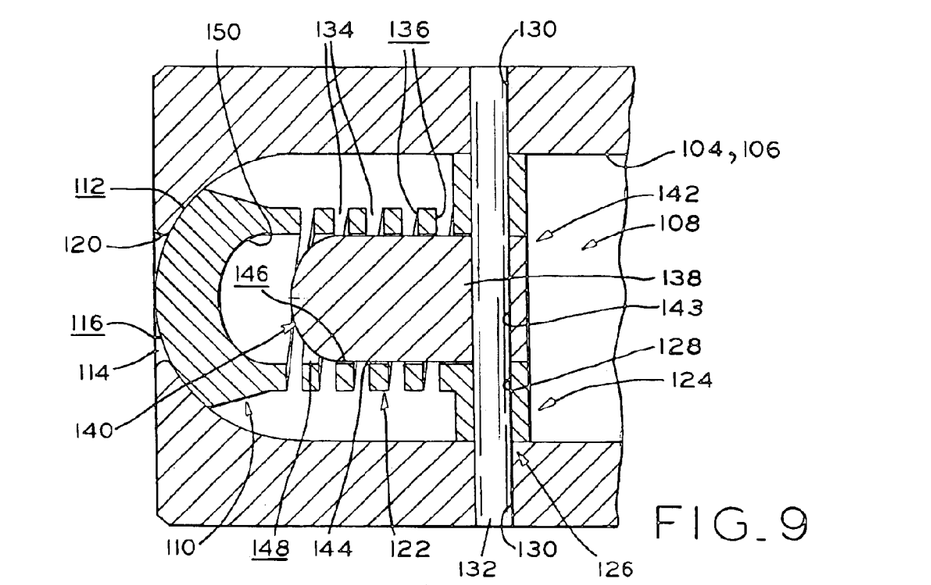
FIG. 9 is a sectional side view of a discharge valve assembly of a compression mechanism of the compressor assembly of FIG. 1, shown in its closed position.
Figure 10:
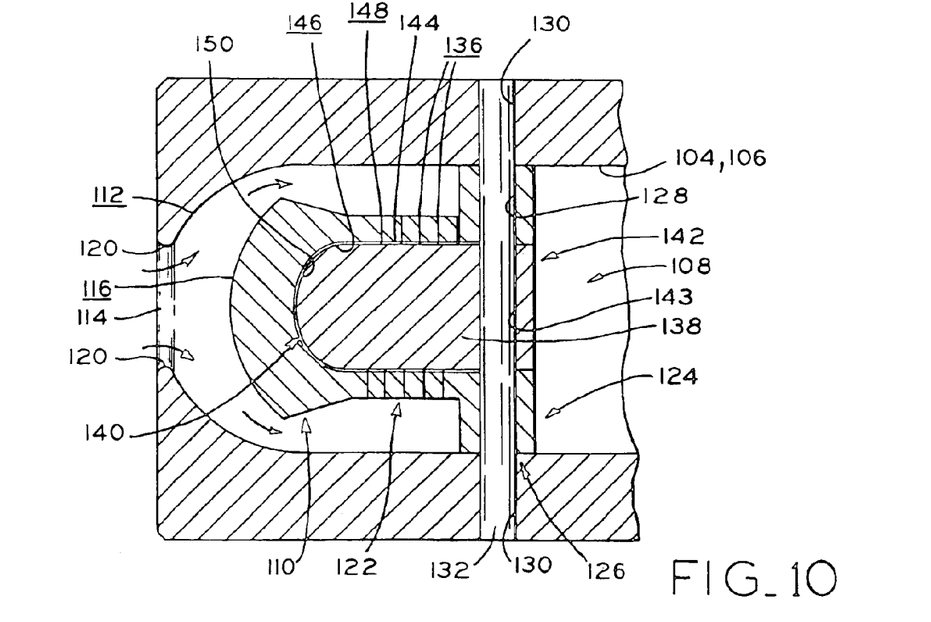
FIG. 10 is sectional side view of the discharge valve assembly of FIG. 9, shown in its open position.

Substantially the entire surface of semi-spherical sealing surface 116 facing compression chamber 118 of compression mechanisms 50 and 52 is exposed to fluid pressure generated during compressor operation. The semi-spherical shape of sealing surface 116 provides a larger surface area than a flat surface of the same diameter.

Semi-spherical valve seat 112 has substantially the same radius of curvature as that of spherical sealing surface 116, so shifting, cocking, tilting or other dislocations of discharge valve 108 will not affect sealing contact during valve closing. The radial inner edge of discharge outlet 114 has round chamfer 120 (FIGS. 9 and 10) which helps to smooth fluid flow through discharge outlet 114, reducing turbulence that may affect compressor efficiency.

Discharge valve 108 is fixed inside discharge passages 104 and 106 by coupling attachment 126 affixed to valve support 124. Coupling attachment 126 includes bore 128 extending longitudinally through valve support 124 which is aligned with bores 130 in cylinder block 68 or outboard bearing 80 to receive spring pin 132. Spring pin 132 secures discharge valve 108 within passages 104 and 106 such that valve spring 122 is slightly prestressed to prevent leakage during the gas compression process. Discharge valve 108 reciprocates between a first, closed position (FIG. 9) in which sealing surface 116 engages semi-spherical seating surface 112 and a second, open position (FIG. 10) with sealing surface 116 spaced longitudinally away from seating surface 112. During valve opening and compression of spring 122, the longitudinal movements of the discharge valve 108 toward the second position stops when gaps 134, having normally separated facing surfaces 136, of rectangular wire spring 122 are closed.

Guide member 138 may be provided to guide and maintain the longitudinal movement of spring 122, when the compression load applied to rectangular wire spring 122 is high, for example. Guide member 138 is substantially cylindrically shaped having a diameter smaller than the inner diameter of spring 122. Front end 140 of guide member 138 is rounded, forming an additional valve stop. Rear end 142 of guide member 138 has bore 143 drilled therethrough which is aligned with bores 128 and 130 to receive a portion of spring pin 132. The alignment of bores 128, 130, and 143 to receive pin 132 provides for easy assembly of discharge valve 108 and guide member 138 within the respective cylinder block, main bearing, or outboard bearing. Clearance space 144 is provided between outer surface 146 of guide member 138 and inner surface 148 of spring 122. Clearance space 144 permits predetermined pivotal movements of valve spring 122 without friction which can delay opening and closing of the valve.

In an attempt to reduce the weight of the discharge valve 108, spherical or conical cavity 150 is formed in the backside of discharge valve 108. Cavity 150 increases the surface area affected by backpressure within discharge passages 104 and 106. Cavity 150 increases the area to which fluid pressure is applied, thus accelerating closure of discharge valve 108.

Figure 11:
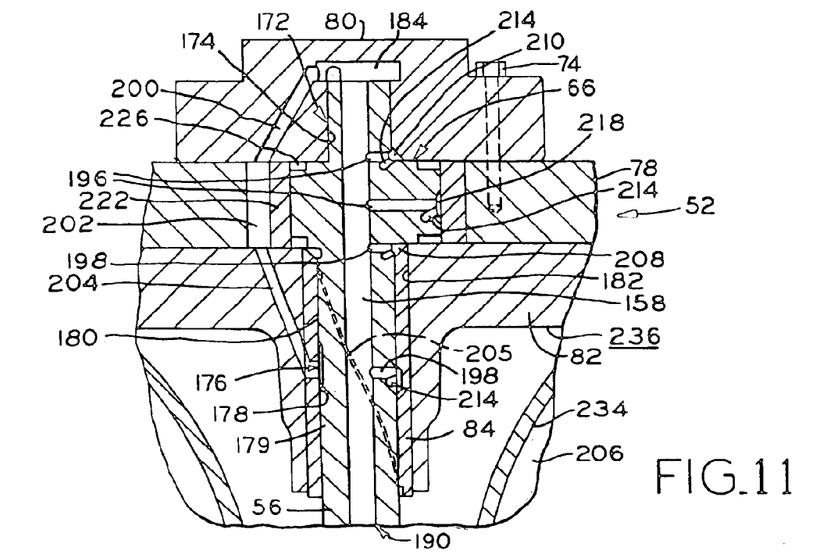
FIG. 11 is a fragmentary sectional view of the upper drive shaft of the compressor assembly of FIG. 1.
Figure 12:
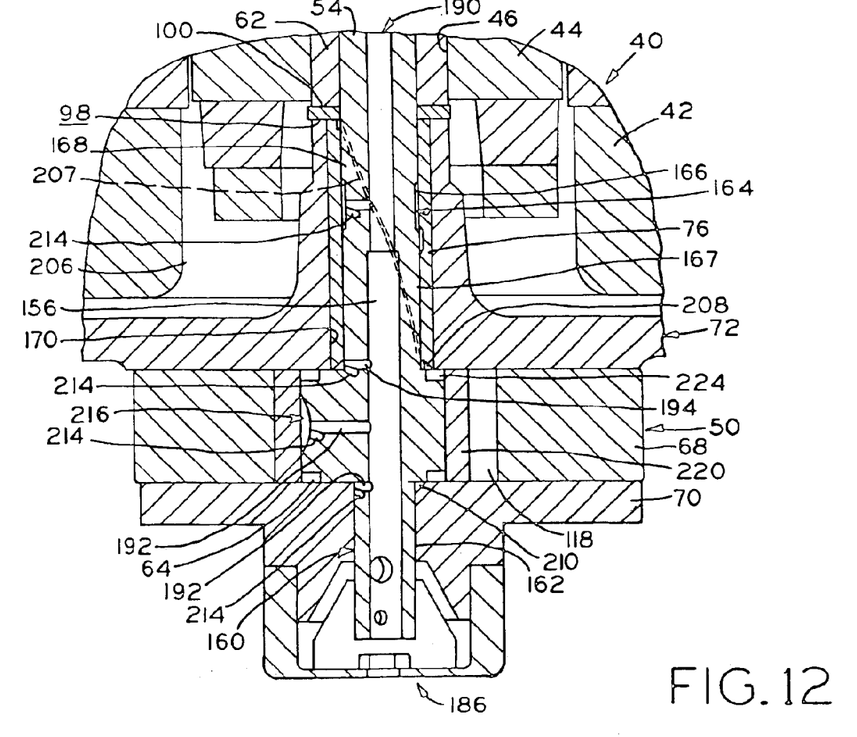
FIG. 12 is a fragmentary sectional view of the lower drive shaft of the compressor assembly of FIG. 1.

Referring now to FIGS. 1, 11, and 12, the lubrication system of the present invention is formed primarily in drive shaft 48, including lower and upper drive shafts 54 and 56 coupled together by sleeve 62. Oil delivery channels 156 and 158 are formed in fluid communication centrally along the axis of rotation through drive shafts 54 and 56, respectively. At the upper end of oil channel 158, formed in outboard bearing 80, is chamber 184. Located at the lower end of lower drive shaft 54 is positive displacement oil pump 186 (FIG. 1) which is operably associated with outboard bearing 70 and oil channels 156 and 158. The lower end of drive shaft 54, outboard bearing 70, and oil pump 186 are submerged in oil sump 188 formed in lower compression module 22. The lubricating oil in sump 188 also supplies oil to the reciprocating vane of compression mechanism 50. Further, the oil in sump 189 of upper end compression module 24 is necessary for providing lubrication to the reciprocating vane of compression mechanism 52.

Referring to FIGS. 11 and 12, lower drive shaft 54 includes portion 160 supportingly received in bore 162 of outboard bearing 70 and oil annulus 164 defined by recessed area 166. Lower and upper journals 167 and 168 are formed on shaft 54 adjacent annulus 164 and are supportingly received in main bearing bore 170 of main bearing 72. Journal 76 is positioned between lower shaft 54 and main bearing bore 170, in contact with journals 167 and 168 to rotatably support shaft 54 in main bearing 72. Upper drive shaft 56 includes portion 172 rotatably received in bore 174 of outboard bearing 80. Oil annulus 176 is defined by recessed area 178 in upper drive shaft 56. Lower and upper journals 179 and 180 are formed on upper shaft 56 adjacent annulus 176 and are supportingly received in main bearing bore 182 of main bearing 82. Journal 84 is positioned between shaft 56 and main bearing bore 182, in contact with journals 179 and 180 to rotatably support shaft 56 in main bearing 82.

Rotation of drive shaft 48 operates positive displacement pump 186 to draw oil from sump 188 into oil supply passageway 190 formed by oil delivery channels 156 and 158 and into chamber 184. The pumping action of pump 186 is dependent upon the rotational speed of drive shaft 48. Oil in oil supply passageway 190 flows into a series of radially extending passages 192 and 194 located in lower shaft 54 by centrifugal force created during rotation of shaft 48. Passages 192 are associated with eccentric 64 and passages 194 are formed in journal 167 and annulus 164. The lubrication oil delivered through oil supply passageway 190 also flows into a series of radially extending passages 196 and 198 located in upper shaft 56 and into chamber 184. Passages 196 are locating in eccentric 66 with one passage 198 being formed in journal 179 and one in oil annulus 176.

Referring to FIG. 11, downwardly inclined channel 200 is formed in outboard bearing 80 extending from chamber 184 to one end of axial channel 202 formed in cylinder block 78 of second stage compression mechanism 52. Extending from a second end of axial channel 202 is downwardly inclined channel 204 formed in main bearing 82 which is in fluid communication with oil annulus 176 defined in upper drive shaft 56. Oil annulus 176 is in fluid communication with helical oil groove 205 formed in the inner wall of journal 84, compartment 206 in electric motor module 26, annular cavity 208 formed in journal 84, and annular cavity 210 formed in outboard bearing 80.

Oil supplied to chamber 184 located at the top end of upper drive shaft 56 flows through channels 200, 202, and 204 to oil annulus 176 and combines with oil supplied by radially extending passage 198. At least a portion of the oil flows upwardly to lubricate upper journal 180 and downwardly to lubricate lower journal 179 through helical journal groove 205. The excess lubricating oil is returned to the oil sump 188 by traveling through electric motor module 26 and passages 212 (FIG. 1) extending through main bearing 72. Referring to FIG. 12, oil passing through oil supply passageway 190 enters radial passage 194 to fill annulus 164. Helical groove 207 may be formed in journal 76 to direct the lubricating oil in annulus 164 to lower and upper journals 167 and 168.

Due to extended length of oil supply passageway 190, lubrication of lower journal bearings 76, 167, and 168, and particularly upper journal bearings 84, 179, and 180, can be delayed, preventing the formation of an oil film to separate the interfacing bearing surfaces. The expected life of bearings is partially related to the oil film thickness between the interfacing bearing surfaces. The required clearance for mating parts of rotary compressors is in the range of 0.0005 inches to 0.0011 inches, thus the thickness of the oil film is very small. During initial operation of compressor 20, there is no oil film located between the interfacing bearing surfaces and thus, the bearing surfaces are in metal-to-metal contact. During peak load operation of the compressor, the frequency of starting and stopping the compressor is high, and some of the oil used to form the film will return to oil sump 188 due to gravity. A portion of the oil will remain between the interfacing bearing surfaces, however, the amount of oil is not great enough to support formation of adequate film thickness. The contact between the interfacing bearing surfaces will cause locally high stresses resulting in fatigue of the bearing material.

In prior art compressors, oil retaining recesses are used to contain the lubricating oil flowing from the journal surface when the compressor stops frequently, however, these recesses will not provide lubricating oil to the bearings at start-up. Further, the prior art compressors have been provided with circumferential grooves which form the oil retaining recesses. These grooves may weaken the drive shaft.

In order to provide lubricating oil to the interfacing bearings surfaces during initial start-up and frequent starting and stopping of the compressor, drive shafts 54 and 56 of the present invention are provided with oil accumulating cylindrical cavities 214. Cavities 214 are formed in drive shafts 54 and 56 being inclined downwardly from the external oil delivery end of radially extending passages 192, 194, 196, and 198. Cavities 214 are "blind" bores meaning that the bores do not extend completely through drive shafts 54 and 56, having a closed terminus end, e.g., a terminus end that lies within the drive shaft material, and are not in fluid communication with oil supply passageway 190. Cavities 214 are located beneath each radially extending passage 192, 194, 196, and 198 with the opening of each cavity 214 being at least partially located in one of the radially extending passages. Cavities 214 and passages 192, 194, 196, and 198 are radially aligned with the passage being located directly above the cavity.

The outlet part of each radially extending passages 192, 194, 196, and 198 is in fluid communication with annular recess cavities 208, 210, oil annulus recesses 164, 176, and cavities 216, 218. Cavities 216, 218 are formed between rollers 220, 222 and eccentrics 64, 66. Rollers 220, 222 are mounted to drive shafts 54, 56 in surrounding relationship of eccentrics 64, 66 to help drive compression mechanisms 50, 52. When the compressor is stopped, the oil accumulated in the cavities 208, 210, 164, 176, 216, and 218 will tend to flow downwardly due to gravity. A portion of the oil collected in cavities 208, 210, 164, 176, 216, and 218 will be directed to the oil sump 188 while a portion of the oil in these cavities will be directed to oil accumulating cavities 214. During start-up of compressor 20, lubricant stored in cavities 214 is drawn out of cavities 214 by centrifugal force to supply lubrication to the interfacing bearing surfaces before the oil being forced through oil supply passageway 190 by oil pump 186 can reach these surfaces. Additionally, upper compression module 24 is charged with lubricating oil during compressor assembly which also provides compression mechanism 52 with lubrication during compressor start-up. This eliminates the metal-to-metal contact between bearing surfaces at start-up and improves reliability of the compressor. Oil accumulating recesses 224 and 226 are formed in the upper planar surfaces of lower and upper shaft eccentrics 64 and 66 to receive oil as the compressor stops. The oil in recesses 224 and 226 is immediately supplied to the contacting surfaces of rollers 220, 222 and eccentrics 64, 66 at compressor start-up.

Referring to FIG. 1, during compressor operation, the flow of fluid through compressor 20 is as follows. Low pressure suction gas is supplied directly to first stage compression mechanism 50 of lower end compression module 22 via suction inlet 88 or 92 (FIGS. 2 and 3). As drive shaft 48 rotates, compression mechanism 50 is driven to compress the low pressure suction gas to an intermediate pressure. The intermediate pressure gas is discharged through discharge port 90 (FIG. 2), past discharge valve 108 in discharge passage 104 and into discharge tube 152. The intermediate pressure gas flows along tube 152 into a unit cooler 153 located outside of the compressor casing. Subsequently, the cooled intermediate pressure refrigerant gas is introduced into compartment 206 of electric motor module 26 through inlet tube 228. Compartment 206 is in fluid communication with compartment 230 of lower end compression module 22 through oil passages 212, which allow oil to be reclaimed by oil sump 188. Introduction of the cooled refrigerant gas into electric motor compartment 206 helps to cool electric motor 40. Further, by cooling the intermediate pressure gas, the amount of heat transfer between the lubricant and the refrigerant gas is reduced due to the minimal temperature difference between the two fluids. Conically shaped baffle 234 separates incoming lubricating oil from the intermediate pressure gas entering upper compression module 24 and prevents suction port 94 formed in main bearing 82 from direct suction of oil coming from motor stator-rotor gap 238. Baffle 234 is secured to surface 236 of main bearing 82, being concentric with drive shaft 48. The intermediate pressure refrigerant gas entering second stage compression mechanism 52 is compressed to a higher, discharge pressure. The high pressure gas is then discharged past discharge valve 108 located in discharge passage 106 into high pressure discharge compartment 154 defined in upper end compression module 24 and through discharge tube 242 mounted in cap 32 to the refrigeration system (not shown). Outboard bearing 80 acts to separate oil supply passageway 190 and chamber 184 from the high pressure fluid in cavity 150. The high pressure, discharge gas from second stage compression mechanism 52 contains some oil. A portion of this oil is separated from the discharge gas and is trapped in oil sump 189 of upper end compression module 24 before the gas is discharged through gas inlet 241 located at the inner end of tube 242. Discharge tube 242 includes a series of inlet holes 244 and bleed hole 246 located near the bottom of tube 242. As oil level in the sump reaches the height of bleed hole 246, gas inlet 241 is submersed in the oil. The discharge pressure gas then enters discharge tube 242 through inlet holes 244. Oil is aspirated through hole 246 and into discharge tube 242 under action of the discharge flow through inlet holes 244.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A hermetic compressor comprising:
    a housing;
    a motor mounted in said housing;
    a compression mechanism located in said housing;
    a bearing;
    a vertically extending drive shaft supported by said bearing and having an eccentric portion integrally formed in said drive shaft, said eccentric portion operatively coupling said motor and said compression mechanism, a longitudinal passageway centrally located in said drive shaft;
    at least one radially extending bore formed in said eccentric portion of said drive shaft, said bore being in fluid communication with said longitudinal passageway and an outer periphery of said eccentric portion of said drive shaft; and
    a downwardly extending, blind cavity formed in said eccentric portion of said drive shaft, said blind cavity being located beneath said radially extending bore and having a closed lower end disposed within said eccentric portion wherein oil is accumulateable within said blind cavity.

2. The compressor of claim 1, wherein said blind cavity has an opening at least partially located in said radially extending bore.

3. The compressor of claim 1, wherein said blind cavity and said radially extending bore are radially aligned.

4. The compressor of claim 1, wherein said blind cavity is an oil accumulating cavity in which oil is stored upon compressor shutdown.

5. The compressor of claim 1, wherein a roller is disposed on said eccentric portion and said outer periphery of said eccentric portion defines a second cavity in fluid communication with said blind cavity.

6. A hermetic compressor comprising:
    a housing having an oil containing sump formed therein;
    a motor mounted in said housing;
    a compression mechanism located in said housing;
    a bearing disposed in a stationary frame;
    a drive shaft supported by said bearing and having first and second ends, said drive shaft operatively coupling said motor and said compression mechanism, a longitudinal oil supply passageway extending through said drive shaft in fluid communication with said sump;
    a chamber located at said first end of said drive shaft in fluid communication with said oil supply passageway, oil from said sump being provided to said chamber through said oil supply passageway; and
    an oil return passageway extending from said chamber to an annulus formed between said bearing and said drive shaft and extending at least partially through said stationary frame, lubricating oil being provided to said annulus through said oil return passageway, whereby the bearing and drive shaft interface is lubricated.

7. The compressor of claim 6, wherein said compression mechanism further comprises a cylinder block having opposite sides, said frame positioned adjacent a first side of said cylinder block, and an outboard bearing positioned adjacent a second side of said cylinder block, said first end of said drive shaft being rotatably supported by said outboard bearing.

8. The compressor of claim 7, wherein said oil return passageway is formed by a first passage extending through said outboard bearing from said chamber, a second passage extending through said cylinder block, and a third passage extending through said frame to said bearing.

9. The compressor of claim 7, wherein said bearing has a groove formed therein, the oil in said annulus being directed by said groove to upper and lower ends of said bearing.

10. The compressor of claim 7, wherein said annulus is formed in said drive shaft.

11. The compressor of claim 7, wherein excess oil in said annulus flows over portions of said motor into said sump, whereby said motor is cooled.

12. The compressor of claim 7, further comprising a second compression mechanism located at said second end of said drive shaft, said second compression mechanism including a second cylinder block having opposite sides, a second outboard bearing adjacent a first side of said second cylinder block, and a second frame comprising a second said bearing adjacent a second side of said second cylinder block.

13. The compressor of claim 12, wherein said second bearing has a port extending therethrough through which oil being returned to said sump passes.

14. A hermetic compressor for compressing refrigerant therein comprising:
    a housing including at least a first and second compartment, a motor mounted in said first compartment and a compression mechanism located in said second compartment, gas compressed by said compression mechanism being discharged into said second compartment;
    a drive shaft operatively coupling said motor and said compression mechanism;
    a lubricating oil sump formed in said second compartment; and
    a discharge tube located in said second compartment through which refrigerant gas in said second compartment exits the compressor, said discharge tube including means for aspirating oil from said oil sump when the oil in said oil sump reaches a particular level.

15. The compressor of claim 14, further comprising a bearing separating said first and second compartments having a port located in said bearing, refrigerant gas in said first compartment entering said second compartment via said port, the refrigerant gas compressed to a discharge pressure by said compression mechanism and discharged into said second compartment.

16. The compressor of claim 14, wherein said means for aspirating oil from said oil sump includes at least one bleed aperture and at least one first refrigerant gas inlet aperture formed in said discharge tube, said inlet aperture being located above said bleed aperture.

17. The compressor of claim 16, wherein said discharge tube has a second gas inlet, said bleed aperture being located above said second gas inlet, wherein when the oil in said oil sump reaches said bleed aperture, said second gas inlet is submersed.

18. The compressor of claim 17, wherein the discharged refrigerant gas enters said discharge tube via said first inlet aperture when the oil in said oil sump reaches said bleed aperture, whereby the oil is aspirated through said bleed aperture under the action of the discharged refrigerant fluid.

* * * * *